(12) United States Patent
Nowack et al.

(10) Patent No.: US 8,948,356 B2
(45) Date of Patent: Feb. 3, 2015

(54) SYSTEM AND METHOD FOR ROUTING COMMUNICATIONS

(71) Applicant: Twilio, Inc., San Francisco, CA (US)

(72) Inventors: Matthew D Nowack, San Francisco, CA (US); Patrick Malatack, San Francisco, CA (US); Thomas Wilsher, San Francisco, CA (US); Chad Selph, San Francisco, CA (US)

(73) Assignee: Twilio, Inc., San Francisco, CA (US)

(*) Notice: Subject to any disclaimer, the term of this patent is extended or adjusted under 35 U.S.C. 154(b) by 0 days.

(21) Appl. No.: 14/054,439

(22) Filed: Oct. 15, 2013

(65) Prior Publication Data
US 2014/0105372 A1  Apr. 17, 2014

Related U.S. Application Data

(60) Provisional application No. 61/714,108, filed on Oct. 15, 2012.

(51) Int. Cl.
*H04M 15/00* (2006.01)
*H04M 7/00* (2006.01)

(52) U.S. Cl.
CPC .......... *H04M 15/82* (2013.01); *H04M 15/8044* (2013.01); *H04M 15/8055* (2013.01); *H04M 15/8351* (2013.01); *H04M 15/84* (2013.01); *H04M 15/85* (2013.01); *H04M 15/851* (2013.01); *H04M 15/852* (2013.01)
USPC .................................. 379/114.02; 379/221.02

(58) Field of Classification Search
USPC ............. 379/114.01, 114.02, 121.02, 220.01, 379/221.01, 221.02
See application file for complete search history.

(56) References Cited

U.S. PATENT DOCUMENTS

| | | | |
|---|---|---|---|
| 5,274,700 | A | 12/1993 | Gechter et al. |
| 5,526,416 | A | 6/1996 | Dezonno et al. |
| 5,581,608 | A | 12/1996 | Jreij et al. |
| 5,598,457 | A | 1/1997 | Foladare et al. |
| 6,026,440 | A | 2/2000 | Shrader et al. |
| 6,094,681 | A | 7/2000 | Shaffer et al. |
| 6,138,143 | A | 10/2000 | Gigliotti et al. |
| 6,185,565 | B1 | 2/2001 | Meubus et al. |

(Continued)

FOREIGN PATENT DOCUMENTS

| | | |
|---|---|---|
| DE | 1684587 A | 3/1971 |
| EP | 0282126 A | 9/1988 |

(Continued)

OTHER PUBLICATIONS

Complaint for Patent Infringement, *Telinit Technologies, LLC* v. *Twilio Inc.*, dated Oct. 12, 2012.

*Primary Examiner* — Quoc D Tran
(74) *Attorney, Agent, or Firm* — Jeffrey Schox; Brian Van Osdol

(57) ABSTRACT

A system and method that includes receiving a communication request of an account, the communication request including communication properties; identifying at least two routing options of a route priority list, the routing options capable of completing the communication request and identified according to a priority heuristic; generating a communication cost from the communication properties; and upon receipt of the routing response and the communication cost response, executing a communication with a routing option of the routing priority list and committing a cost of the communication to the account.

13 Claims, 11 Drawing Sheets

(56) References Cited

U.S. PATENT DOCUMENTS

| | | | |
|---|---|---|---|
| 6,192,123 B1 | 2/2001 | Grunsted et al. | |
| 6,223,287 B1 | 4/2001 | Douglas et al. | |
| 6,269,336 B1 | 7/2001 | Ladd et al. | |
| 6,373,836 B1 | 4/2002 | Deryugin et al. | |
| 6,425,012 B1 | 7/2002 | Trovato et al. | |
| 6,430,175 B1 | 8/2002 | Echols et al. | |
| 6,434,528 B1 | 8/2002 | Sanders | |
| 6,445,694 B1 | 9/2002 | Swartz | |
| 6,445,776 B1 | 9/2002 | Shank et al. | |
| 6,459,913 B2 | 10/2002 | Cloutier | |
| 6,493,558 B1 | 12/2002 | Bernhart et al. | |
| 6,496,500 B2 | 12/2002 | Nance et al. | |
| 6,501,832 B1 | 12/2002 | Saylor et al. | |
| 6,507,875 B1 | 1/2003 | Mellen-Garnett et al. | |
| 6,600,736 B1 | 7/2003 | Ball et al. | |
| 6,606,596 B1 | 8/2003 | Zirngibl et al. | |
| 6,614,783 B1 | 9/2003 | Sonesh et al. | |
| 6,625,258 B1 | 9/2003 | Ram et al. | |
| 6,625,576 B2 | 9/2003 | Kochanski et al. | |
| 6,636,504 B1 | 10/2003 | Albers et al. | |
| 6,662,231 B1 | 12/2003 | Drosset et al. | |
| 6,704,785 B1 | 3/2004 | Koo et al. | |
| 6,707,889 B1 | 3/2004 | Saylor et al. | |
| 6,711,249 B2 | 3/2004 | Weissman et al. | |
| 6,738,738 B2 | 5/2004 | Henton | |
| 6,757,365 B1 | 6/2004 | Bogard | |
| 6,765,997 B1 | 7/2004 | Zirngibl et al. | |
| 6,768,788 B1 | 7/2004 | Langseth et al. | |
| 6,778,653 B1 | 8/2004 | Kallas et al. | |
| 6,785,266 B2 | 8/2004 | Swartz | |
| 6,788,768 B1 | 9/2004 | Saylor et al. | |
| 6,792,086 B1 | 9/2004 | Saylor et al. | |
| 6,798,867 B1 | 9/2004 | Zirngibl et al. | |
| 6,807,529 B2 | 10/2004 | Johnson et al. | |
| 6,807,574 B1 | 10/2004 | Partovi et al. | |
| 6,819,667 B1 | 11/2004 | Brusilovsky et al. | |
| 6,829,334 B1 | 12/2004 | Zirngibl et al. | |
| 6,834,265 B2 | 12/2004 | Balasuriya | |
| 6,836,537 B1 | 12/2004 | Zirngibl et al. | |
| 6,842,767 B1 | 1/2005 | Partovi et al. | |
| 6,850,603 B1 | 2/2005 | Eberle et al. | |
| 6,870,830 B1 | 3/2005 | Schuster et al. | |
| 6,873,952 B1 | 3/2005 | Bailey et al. | |
| 6,874,084 B1 | 3/2005 | Dobner et al. | |
| 6,885,737 B1 | 4/2005 | Gao et al. | |
| 6,888,929 B1 | 5/2005 | Saylor et al. | |
| 6,895,084 B1 | 5/2005 | Saylor et al. | |
| 6,898,567 B2 | 5/2005 | Balasuriya | |
| 6,912,581 B2 | 6/2005 | Johnson et al. | |
| 6,922,411 B1 | 7/2005 | Taylor | |
| 6,931,405 B2 | 8/2005 | El-Shimi et al. | |
| 6,937,699 B1 | 8/2005 | Schuster et al. | |
| 6,940,953 B1 | 9/2005 | Eberle et al. | |
| 6,941,268 B2 | 9/2005 | Porter et al. | |
| 6,947,417 B2 | 9/2005 | Laursen et al. | |
| 6,947,988 B1 | 9/2005 | Saleh | |
| 6,961,330 B1 | 11/2005 | Cattan et al. | |
| 6,964,012 B1 | 11/2005 | Zirngibl et al. | |
| 6,970,915 B1 | 11/2005 | Partovi et al. | |
| 6,977,992 B2 | 12/2005 | Zirngibl et al. | |
| 6,985,862 B2 | 1/2006 | Stroem et al. | |
| 7,003,464 B2 | 2/2006 | Ferrans et al. | |
| 7,006,606 B1 | 2/2006 | Cohen et al. | |
| 7,010,586 B1 | 3/2006 | Allavarpu et al. | |
| 7,020,685 B1 | 3/2006 | Chen et al. | |
| 7,039,165 B1 | 5/2006 | Saylor et al. | |
| 7,062,709 B2 | 6/2006 | Cheung | |
| 7,076,037 B1 * | 7/2006 | Gonen et al. | 379/114.02 |
| 7,076,428 B2 | 7/2006 | Anastasakos et al. | |
| 7,089,310 B1 | 8/2006 | Ellerman et al. | |
| 7,103,003 B2 | 9/2006 | Brueckheimer et al. | |
| 7,103,171 B1 | 9/2006 | Annadata et al. | |
| 7,106,844 B1 | 9/2006 | Holland | |
| 7,111,163 B1 | 9/2006 | Haney | |
| 7,140,004 B1 | 11/2006 | Kunins et al. | |
| 7,143,039 B1 | 11/2006 | Stifelman et al. | |
| 7,197,331 B2 | 3/2007 | Anastasakos et al. | |
| 7,197,461 B1 | 3/2007 | Eberle et al. | |
| 7,197,462 B2 | 3/2007 | Takagi et al. | |
| 7,197,544 B2 | 3/2007 | Wang et al. | |
| 7,225,232 B2 | 5/2007 | Elberse | |
| 7,227,849 B1 | 6/2007 | Raesaenen | |
| 7,260,208 B2 * | 8/2007 | Cavalcanti | 379/221.01 |
| 7,266,181 B1 | 9/2007 | Zirngibl et al. | |
| 7,269,557 B1 | 9/2007 | Bailey et al. | |
| 7,272,212 B2 | 9/2007 | Eberle et al. | |
| 7,272,564 B2 | 9/2007 | Phillips et al. | |
| 7,277,851 B1 | 10/2007 | Henton | |
| 7,283,515 B2 | 10/2007 | Fowler | |
| 7,286,521 B1 | 10/2007 | Jackson et al. | |
| 7,287,248 B1 | 10/2007 | Adeeb | |
| 7,289,453 B2 | 10/2007 | Riedel et al. | |
| 7,296,739 B1 | 11/2007 | Mo et al. | |
| 7,298,732 B2 | 11/2007 | Cho | |
| 7,308,085 B2 | 12/2007 | Weissman | |
| 7,308,408 B1 | 12/2007 | Stifelman et al. | |
| 7,324,633 B2 | 1/2008 | Gao et al. | |
| 7,324,942 B1 | 1/2008 | Mahowald et al. | |
| 7,330,463 B1 | 2/2008 | Bradd et al. | |
| 7,330,890 B1 | 2/2008 | Partovi et al. | |
| 7,340,040 B1 | 3/2008 | Saylor et al. | |
| 7,349,714 B2 | 3/2008 | Lee et al. | |
| 7,369,865 B2 | 5/2008 | Gabriel et al. | |
| 7,376,223 B2 | 5/2008 | Taylor et al. | |
| 7,376,586 B1 | 5/2008 | Partovi et al. | |
| 7,376,740 B1 | 5/2008 | Porter et al. | |
| 7,412,525 B2 | 8/2008 | Cafarella et al. | |
| 7,428,302 B2 | 9/2008 | Zirngibl et al. | |
| 7,440,898 B1 | 10/2008 | Eberle et al. | |
| 7,447,299 B1 | 11/2008 | Partovi et al. | |
| 7,454,459 B1 | 11/2008 | Kapoor et al. | |
| 7,457,397 B1 | 11/2008 | Saylor et al. | |
| 7,486,780 B2 | 2/2009 | Zirngibl et al. | |
| 7,496,054 B2 | 2/2009 | Taylor | |
| 7,500,249 B2 | 3/2009 | Kampe et al. | |
| 7,505,951 B2 | 3/2009 | Thompson et al. | |
| 7,519,359 B2 | 4/2009 | Chiarulli et al. | |
| 7,522,711 B1 | 4/2009 | Stein et al. | |
| 7,536,454 B2 | 5/2009 | Balasuriya | |
| 7,552,054 B1 | 6/2009 | Stifelman et al. | |
| 7,571,226 B1 | 8/2009 | Partovi et al. | |
| 7,613,287 B1 | 11/2009 | Stifelman et al. | |
| 7,623,648 B1 | 11/2009 | Oppenheim et al. | |
| 7,630,900 B1 | 12/2009 | Strom | |
| 7,631,310 B1 | 12/2009 | Henzinger | |
| 7,644,000 B1 | 1/2010 | Strom | |
| 7,657,433 B1 | 2/2010 | Chang | |
| 7,657,434 B2 | 2/2010 | Thompson et al. | |
| 7,668,157 B2 | 2/2010 | Weintraub et al. | |
| 7,672,295 B1 | 3/2010 | Andhare et al. | |
| 7,675,857 B1 | 3/2010 | Chesson | |
| 7,676,221 B2 | 3/2010 | Roundtree et al. | |
| 7,779,065 B2 * | 8/2010 | Gupta et al. | 709/202 |
| 7,882,253 B2 | 2/2011 | Pardo-Castellote et al. | |
| 7,920,866 B2 | 4/2011 | Bosch et al. | |
| 7,926,099 B1 | 4/2011 | Chakravarty et al. | |
| 7,936,867 B1 | 5/2011 | Hill et al. | |
| 7,962,644 B1 | 6/2011 | Ezerzer et al. | |
| 7,979,555 B2 | 7/2011 | Rothstein et al. | |
| 8,023,425 B2 | 9/2011 | Raleigh | |
| 8,081,958 B2 | 12/2011 | Soederstroem et al. | |
| 8,103,725 B2 | 1/2012 | Gupta et al. | |
| 8,126,128 B1 | 2/2012 | Hicks, III et al. | |
| 8,149,716 B2 | 4/2012 | Ramanathan et al. | |
| 8,150,918 B1 | 4/2012 | Edelman et al. | |
| 8,233,611 B1 | 7/2012 | Zettner | |
| 8,266,327 B2 | 9/2012 | Kumar et al. | |
| 8,295,272 B2 | 10/2012 | Boni et al. | |
| 8,326,805 B1 | 12/2012 | Arous et al. | |
| 8,346,630 B1 | 1/2013 | McKeown | |
| 8,532,686 B2 | 9/2013 | Schmidt et al. | |
| 8,675,493 B2 | 3/2014 | Buddhikot et al. | |
| 2002/0006124 A1 | 1/2002 | Jimenez et al. | |
| 2002/0006125 A1 | 1/2002 | Josse et al. | |

(56) References Cited

U.S. PATENT DOCUMENTS

| | | |
|---|---|---|
| 2002/0006193 A1 | 1/2002 | Rodenbusch et al. |
| 2002/0077833 A1 | 6/2002 | Arons et al. |
| 2002/0126813 A1 | 9/2002 | Partovi et al. |
| 2002/0136391 A1 | 9/2002 | Armstrong |
| 2003/0006137 A1 | 1/2003 | Wei et al. |
| 2003/0018830 A1 | 1/2003 | Chen et al. |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0061404 A1 | 3/2003 | Atwal et al. |
| 2003/0088421 A1 | 5/2003 | Maes et al. |
| 2003/0103620 A1 | 6/2003 | Brown et al. |
| 2003/0123640 A1 | 7/2003 | Roelle et al. |
| 2003/0195990 A1 | 10/2003 | Greenblat |
| 2003/0196076 A1 | 10/2003 | Zabarski et al. |
| 2003/0211842 A1 | 11/2003 | Kempf et al. |
| 2003/0231647 A1 | 12/2003 | Petrovykh |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Da Palma et al. |
| 2004/0165569 A1 | 8/2004 | Sweatman et al. |
| 2004/0172482 A1 | 9/2004 | Weissman et al. |
| 2004/0213400 A1 | 10/2004 | Golitsin et al. |
| 2004/0218748 A1* | 11/2004 | Fisher ................ 379/221.01 |
| 2005/0010483 A1 | 1/2005 | Ling |
| 2005/0025303 A1 | 2/2005 | Hostetler |
| 2005/0038772 A1 | 2/2005 | Colrain |
| 2005/0047579 A1 | 3/2005 | Salame |
| 2005/0128961 A1 | 6/2005 | Miloslavsky et al. |
| 2005/0135578 A1 | 6/2005 | Ress et al. |
| 2005/0147088 A1 | 7/2005 | Bao et al. |
| 2005/0177635 A1 | 8/2005 | Schmidt et al. |
| 2005/0238153 A1* | 10/2005 | Chevalier ................ 379/114.2 |
| 2005/0240659 A1 | 10/2005 | Taylor |
| 2005/0243977 A1 | 11/2005 | Creamer et al. |
| 2005/0246176 A1 | 11/2005 | Creamer et al. |
| 2006/0008073 A1 | 1/2006 | Yoshizawa et al. |
| 2006/0015467 A1 | 1/2006 | Morken et al. |
| 2006/0047666 A1 | 3/2006 | Bedi et al. |
| 2006/0067506 A1 | 3/2006 | Flockhart et al. |
| 2006/0129638 A1 | 6/2006 | Deakin |
| 2006/0143007 A1 | 6/2006 | Koh et al. |
| 2006/0168334 A1 | 7/2006 | Potti et al. |
| 2006/0203979 A1 | 9/2006 | Jennings |
| 2006/0209695 A1 | 9/2006 | Archer et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0256816 A1 | 11/2006 | Yarlagadda et al. |
| 2006/0262915 A1 | 11/2006 | Marascio et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0050306 A1 | 3/2007 | Mcqueen |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0208862 A1 | 9/2007 | Fox et al. |
| 2007/0242626 A1 | 10/2007 | Altberg et al. |
| 2007/0265073 A1 | 11/2007 | Novi et al. |
| 2007/0286180 A1 | 12/2007 | Marquette et al. |
| 2007/0291905 A1 | 12/2007 | Halliday et al. |
| 2007/0295803 A1 | 12/2007 | Levine et al. |
| 2008/0025320 A1 | 1/2008 | Bangalore et al. |
| 2008/0037715 A1 | 2/2008 | Prozeniuk et al. |
| 2008/0040484 A1 | 2/2008 | Yardley |
| 2008/0052395 A1 | 2/2008 | Wright et al. |
| 2008/0091843 A1 | 4/2008 | Kulkarni |
| 2008/0104348 A1 | 5/2008 | Kabzinski et al. |
| 2008/0134049 A1 | 6/2008 | Gupta et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0177883 A1 | 7/2008 | Hanai et al. |
| 2008/0209050 A1 | 8/2008 | Li |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0313318 A1 | 12/2008 | Vermeulen et al. |
| 2008/0317222 A1 | 12/2008 | Griggs et al. |
| 2009/0052437 A1 | 2/2009 | Taylor et al. |
| 2009/0052641 A1 | 2/2009 | Taylor et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089699 A1 | 4/2009 | Saha et al. |
| 2009/0093250 A1 | 4/2009 | Jackson et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0232289 A1 | 9/2009 | Drucker et al. |
| 2009/0235349 A1 | 9/2009 | Lai et al. |
| 2009/0252159 A1 | 10/2009 | Lawson et al. |
| 2009/0288165 A1 | 11/2009 | Qiu et al. |
| 2009/0316687 A1 | 12/2009 | Kruppa |
| 2010/0037204 A1 | 2/2010 | Lin et al. |
| 2010/0070424 A1 | 3/2010 | Monk |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0115041 A1 | 5/2010 | Hawkins et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0251329 A1 | 9/2010 | Wei |
| 2010/0251340 A1 | 9/2010 | Martin et al. |
| 2010/0281108 A1 | 11/2010 | Cohen |
| 2011/0029882 A1 | 2/2011 | Jaisinghani |
| 2011/0078278 A1 | 3/2011 | Cui et al. |
| 2011/0081008 A1 | 4/2011 | Lawson et al. |
| 2011/0083179 A1 | 4/2011 | Lawson et al. |
| 2011/0096673 A1 | 4/2011 | Stevenson et al. |
| 2011/0110366 A1 | 5/2011 | Moore et al. |
| 2011/0170505 A1 | 7/2011 | Rajasekar et al. |
| 2011/0176537 A1 | 7/2011 | Lawson et al. |
| 2011/0211679 A1 | 9/2011 | Mezhibovsky et al. |
| 2011/0255675 A1 | 10/2011 | Jasper et al. |
| 2011/0265172 A1 | 10/2011 | Sharma et al. |
| 2011/0267985 A1 | 11/2011 | Wilkinson et al. |
| 2011/0276892 A1 | 11/2011 | Jensen-Horne et al. |

(56) References Cited

U.S. PATENT DOCUMENTS

| | | |
|---|---|---|
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0299672 A1 | 12/2011 | Chiu et al. |
| 2011/0320449 A1 | 12/2011 | Gudlavenkatasiva |
| 2011/0320550 A1 | 12/2011 | Lawson et al. |
| 2012/0017222 A1 | 1/2012 | May |
| 2012/0036574 A1 | 2/2012 | Heithcock et al. |
| 2012/0114112 A1 | 5/2012 | Rauschenberger et al. |
| 2012/0149404 A1 | 6/2012 | Beattie et al. |
| 2012/0173610 A1 | 7/2012 | Bleau et al. |
| 2012/0198004 A1 | 8/2012 | Watte |
| 2012/0201238 A1 | 8/2012 | Lawson et al. |
| 2012/0226579 A1 | 9/2012 | Ha et al. |
| 2012/0239757 A1 | 9/2012 | Firstenberg et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0316809 A1 | 12/2012 | Egolf et al. |
| 2013/0058262 A1 | 3/2013 | Parreira |
| 2013/0156024 A1 | 6/2013 | Burg |
| 2013/0244632 A1 | 9/2013 | Spence et al. |
| 2014/0064467 A1 | 3/2014 | Lawson et al. |
| 2014/0106704 A1 | 4/2014 | Cooke et al. |
| 2014/0153565 A1 | 6/2014 | Lawson et al. |

FOREIGN PATENT DOCUMENTS

| | | |
|---|---|---|
| EP | 1464418 A | 10/2004 |
| EP | 1770586 A1 | 4/2007 |
| ES | 2134107 A | 9/1999 |
| JP | 10294788 | 4/1998 |
| JP | 2004166000 A | 6/2004 |
| JP | 2004220118 A | 8/2004 |
| JP | 2006319914 A | 11/2006 |
| WO | 9732448 A | 9/1997 |
| WO | 02087804 | 11/2002 |
| WO | 2006037492 A | 4/2006 |
| WO | 2009018489 A | 2/2009 |
| WO | 2009124223 A | 10/2009 |
| WO | 2010037064 A | 4/2010 |
| WO | 2010040010 A | 4/2010 |
| WO | 2010101935 A | 9/2010 |
| WO | 2011091085 A | 7/2011 |

* cited by examiner

| Routing Options Description | Internal Cost |
|---|---|
| SMS Carrier A region 1 route | $0.001 |
| SMS Carrier A region 2 route | $0.004 |
| SMS Carrier B region 1 route | $0.003 |
| MMS Carrier A region 1 route | $0.006 |
| MMS Carrier C region 1 route | $0.008 |
| IP Client App D route | $0.000 |

FIGURE 4

| Routing Options Description | Internal Cost | Quota | Quality |
|---|---|---|---|
| SMS Carrier A region 1 route | $0.001 | 3000 | 0.81 |
| SMS Carrier A region 2 route | $0.004 | N/A | 0.85 |
| SMS Carrier B region 1 route | $0.003 | 20 | 0.90 |
| MMS Carrier A region 1 route | $0.006 | -35 | 0.98 |
| MMS Carrier C region 1 route | $0.008 | 5 | 0.96 |
| IP Client App D route | $0.000 | 0 | 0.70 |

FIGURE 5

| Routing Options Description | Quota | Priority |
|---|---|---|
| SMS Carrier A region 1 route | 3000 | 2 |
| SMS Carrier A region 2 route | N/A | 5 |
| SMS Carrier B region 1 route | 20 | 3 |
| SMS Carrier C region 1 route | -35 | 6 |
| SMS Carrier C region 2 route | 5 | 4 |
| SMS Carrier C region 3 route | 6000 | 1 |

FIGURE 6

| Routing Options Description | Internal Cost | # Msg | Effective Cost |
|---|---|---|---|
| SMS Carrier A region 1 route | $0.001 | 3 | $0.003 |
| SMS Carrier A region 2 route | $0.004 | 3 | $0.012 |
| SMS Carrier B region 1 route | $0.003 | 3 | $0.009 |
| MMS Carrier A region 1 route | $0.006 | 1 | $0.006 |
| MMS Carrier C region 1 route | $0.008 | 1 | $0.008 |
| IP Client App D route | $0.000 | 4 | $0.000 |

FIGURE 7

SYSTEM AND METHOD FOR ROUTING COMMUNICATIONS

CROSS-REFERENCE TO RELATED APPLICATIONS

This application claims the benefit of U.S. Provisional Application Ser. No. 61/714,108, filed on 15 Oct. 2012, which is incorporated in its entirety by this reference.

TECHNICAL FIELD

This invention relates generally to the telephony field, and more specifically to a new and useful system and method for routing communications in the telephony field.

BACKGROUND

Communication networking is becoming increasingly more complex. While telephony communication was traditionally the main form of communication, today people have a variety of mediums to communicate such as text messaging, SIP based voice and video calls, IP messaging, proprietary communication channels, and other forms of communication. Additionally, the global community is becoming more connected and communication infrastructure needs to support communication across many globally located regions. Expanding communications globally is not only complicated through technical challenges but it is also complicated by the coordination with partners that is required to support such a platform. Thus, there is a need in the telephony field to create a new and useful system and method for routing communications. This invention provides such a new and useful system and method.

BRIEF DESCRIPTION OF THE FIGURES

FIG. 4 is an exemplary table representation of a routing option priority list with a cost prioritization parameter;

FIG. 5 is an exemplary table representation of a routing option priority list with a multiple parameters used in selecting a routing option;

FIG. 6 is an exemplary table representation of a routing option priority list with a multiple parameters used in selecting a routing option;

FIG. 7 is an exemplary table representation of a routing option priority list with a with effective cost parameters of the routing options;

DESCRIPTION OF THE PREFERRED EMBODIMENTS

The following description of the preferred embodiments of the invention is not intended to limit the invention to these preferred embodiments, but rather to enable any person skilled in the art to make and use this invention.

A System for Routing Communications

Figure 1:
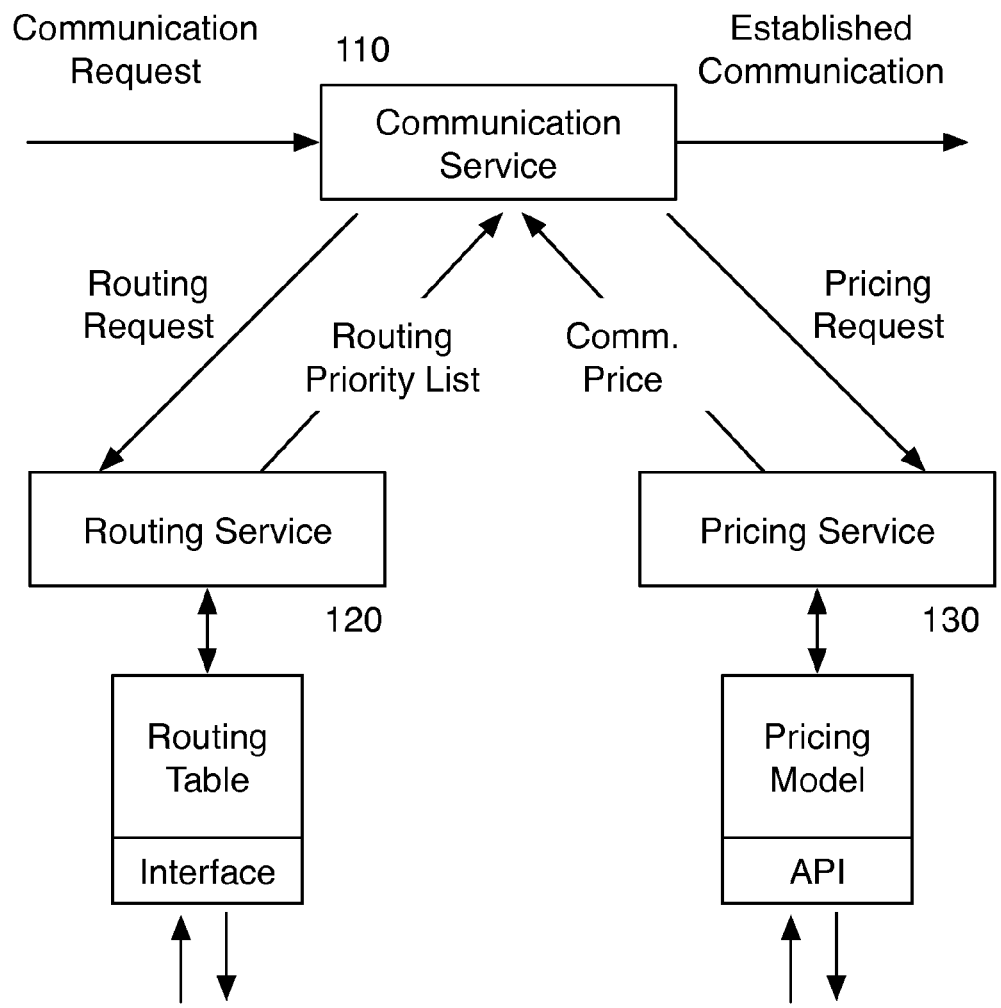
FIG. 1 is a schematic representation of a system of a first preferred embodiment of the invention.

As shown in FIG. 1, a system for routing communications of a preferred embodiment includes a communication service 110, a routing service 120, and a communication cost service 130. The system functions to provide scalable, reliable communications to customers. Additionally, the system functions to enable cost effective determination of communication options for both the platform provider and the source of the outgoing communication. The system is preferably implemented in combination with a telephony platform such as the one described in patent application Ser. No. 12/417,630 filed 2 Apr. 2009, entitled "System and Method for Processing Telephony Sessions", which is hereby incorporated in its entirety by this reference. The telephony platform is preferably a multitenant telephony platform that allows multiple accounts to configure telephony applications for use on the platform. The telephony can be designed for one or more mediums of communication. The telephony platform can additionally be a cloud hosted platform as a service system. The telephony platform can be a server, a server cluster, a collection of components on a distributed computing system, or any suitable network accessible computing infrastructure. The system may alternatively be used in combination with a text or multi-media based messaging system, a video or voice chat system, a screen-sharing system, and/or any suitable communication platform. The system preferably takes a communication request for an outgoing Short Message Service (SMS) text message, Multimedia Messaging Service (MMS) message, push notification, IP-based message, telephony voice call, SIP voice call, video chat/communication session, screen sharing communication session, proprietary communication protocol, and/or any suitable communication protocol and establishes communication using a selected communication option.

The system architecture is preferably configured such that pricing and determination of communication routing may be determined independently from the customer price for the communication. Thus, users of the communication system experience substantially consistent pricing for outgoing messages or communication connections, and additionally experience overall better quality and performance due to improved selection of routing options. A telephony platform can benefit from managing a number of routing options. A telephony platform can be used to serve a diverse collection of communication requests. Such requests may have diverse device endpoint origins, destination endpoints, involved applications, involved devices, involved carriers, involved countries, involved regions, communication content, timing requirements, bandwidth requirements, and other suitable properties. The routing option used for a particular communication will impact the quality of the call based on at least one of these properties. The communication service 110 preferably coordinates with the routing service 120 to determine at least one preferred routing option. Additionally, the communication will have an associated communication cost. The communication cost can similarly be based on the properties of the communication request. The communication cost is the outward cost of a communication as viewed by an account, sub-account, or requesting entity. The communication cost is preferably normalized to provide a stable cost across different routing options and transport protocols. The communication service 110 preferably coordinates with the communication cost service 120 to obtain the communication cost. The system can generate route options and pricing options independently and optionally in parallel to decouple the services. A telephony platform utilizing the system can achieve the benefit of balancing high quality communication performance, while providing stable and fair operational cost to customers.

The communication service 110 of a preferred embodiment functions to receive communication requests and establish communications as regulated by input of the routing service 120 and the communication cost service 130. The communication service 110 can comprise of one or more services that establish communication through various channels and over varying protocols. Depending on the message medium and possibly the origin and destination endpoints, the routing options may be different channel protocols directed at different service provider destinations. For an SMS message, the routing options may be SMPP connections to various service provider destinations. The routing options of an MMS message can be SMTP connections to various service provider destinations (for MM4) or alternatively they can be various service resources accessed over HTTP/SOAP (for MM7). A voice call can have routing options including PSTN channels of different carriers, SIP, and other protocols. The routing options preferably include various commercial relationships between the service provider and the communication platform. The routing options can additionally span multiple mediums/transport protocols. For example, a message router may be configured to selectively transmit a message using a routing option selected from SMS routing options, proprietary push notification routing options (e.g., Apple or Google push notifications) and application messaging routing options (e.g., message sent to a Whatsapp user).

The communication service 110 preferably includes a communication request input to receive communication requests. A communication request preferably specifies a communication destination. The communication destination can be a communication endpoint such as a telephone number, a short code phone number, a SIP address, a communication account identifier, and/or any suitable communication endpoint. The communication request additionally will include an origin identifier. In a first variation, the origin identifier will be the communication endpoint that will be connected or that will be indicated as the sender. The communication endpoint can be some variety of communication endpoints as described above. The communication endpoint of the origin can be the same type or a different type of communication endpoint as the communication destination. The origin identifier can be explicitly included in the communication request or the origin identifier can be associated with an account associated with the communication request. A communication medium may be implicit for the communication system such as in the situation where only one medium is available, but the communication medium may alternatively be specified in the request. The medium can specify a general form of the communication, such as voice, video, text, synchronous, and/or asynchronous. The medium can alternatively specify particular protocols of communication such as SMS, MMS, PSTN, SIP, and the like. In appropriate communication requests, frequently asynchronous communication requests, the content of the communication may be included in the request. For example, the text for an SMS message is preferably included in the communication request. In other variations, the communication request is for establishing a synchronous communication session between the source and the destination such as in a voice or video call where communication can occur between at least two communication endpoints in real-time. The communication service 110 is additionally communicatively coupled to the routing service 120 and the communication cost service 130.

The communication request is preferably received using an application programming interface (API). More preferably the communication request is received through a representational state transfer (REST) API, Restful (i.e., having characteristics of a REST API) can include the characteristics of having a uniform interface separating client and servers, the client-server communication is stateless where all information to process a client request is transferred in the request; cacheable requests if specified, interoperability with a layered service infrastructure, and/or a uniform interface between clients and servers. The API can be exposed externally such that requests directly originate from outside entities. The API can alternatively be an internal API used during operation of the telephony platform.

Communication requests can be directed to both the routing service 120 and the communication cost service 130. Preferably, the requests are routed in parallel but may alternatively occur sequentially. The communication service 110 preferably includes an outbound routing subsystem for establishing outbound communications. The outbound routing subsystem preferably initiates or establishes the communication to the specified destination through a routing option. The communication service no preferably includes a plurality of configured routing options. The routing options may include communication providers such as telephony carriers, communication mediums such as SMS, TXT, or voice, and/or any suitable communication routing option. The routing options preferably determine the manner in which a communication is established for outbound communications.

The routing service 120 of a preferred embodiment functions to generate a list with at least one routing option for the outbound routing of the communication service no. The routing service 120 receives routing requests from the communication service no. The routing service 120 is configured to process the request and use properties of the request to generate at least one selected/recommended routing option. More preferably the routing service generates a set of at least two routing options and returns the list to the communication service 110. The set or list of routing options can be prioritized or include parameters that can be used to select a desired routing option. The routing service 120 preferably includes a routing table. The routing table includes a list of available routing options. In one variation, a routing option in the routing table preferably includes an assigned priority and a weight. The priority and weight may be assigned for different communication parameters. For example, the prefix of a destination phone number is preferably associated with various routing options each having a priority and weight. The routing table can include additionally or alternative parameters associated with the different routing options such as quality score, regional associations (e.g., related country codes or area codes or geographic proximity), quota prioritizations, internal cost (e.g., cost to the platform), effective internal cost (e.g., cost to transmit requested content considering transforming the content into multiple messages), and/or any suitable parameter used in selecting a routing option. The quota prioritization parameter can be used to prioritize a routing option in response to a contractual obligation. Some routing options can be maintained through contractual obligations of meeting a quota of communications (e.g., number of calls, number of messages, rate of communication). This quota prioritization parameter can be dynamically updated or fixed based on the communication restriction. The quota prioritization can be used to positively count towards the selection of that routing option (e.g., if a system wants to meet a certain quota of messages) or alternatively negative impact selection (e.g., if a system wants to avoid going over a limit). The relative properties for the associated routing options are used to generate a route priority list. The routing priority list is a customized list of routing options prioritized for a particular communication request. Multiple routing options are prioritized in order of preference. The listed routing options may not have indicated preference and be a sub-set of the full set of routing options.

The routing service 120 may additionally include a routing table interface such that an administrator or client device may update the parameters used to determine the communication routing. Routing options can preferably be added, removed, or updated. In one exemplary use case, an administrator may need to update the routing options based on contract changes with various carriers. In another exemplary use case, communication performance may unexpectedly drop for a carrier. An administrator could easily edit the routing table such that communications avoid that carrier until the issue is resolved. In yet another use case, communication quality of a used routing option is measured and used to update a quality parameter of a routing option. In another variation, the routing table interface is an application programming interface (API) such that parameters of the routing table may be automatically updated.

The communication cost service 130 of a preferred embodiment functions to generate the cost for the communication according to the communication request. Preferably, the destination is the primary key for determining a communication cost. For voice communications, the telephone number prefix is the primary key. For SMS messages the primary key is preferably the mobile operator of the SMS endpoint. The communication cost service may additionally include a pricing API. The pricing API is preferably a restful interface that may be used internally and/or externally. The communication cost service preferably includes a cost model that is a resource to aid in determination of the price. The cost model can consider multiple factors influencing cost such as involved endpoints, the communication message, the account associated with the request, carrier of involved endpoints, country, and other suitable factors. The cost model may be periodically updated. The cost model may be communicatively coupled to the routing service for automatic updates to the price, but an administrator or any suitable entity may alternatively manually update the cost model. The cost model is preferably fixed within a time window such that customers can expect consistent pricing within that window. However, the cost model may be dynamically updated in real-time to provide reactive pricing.

A Method for Routing Communications

Figure 2:
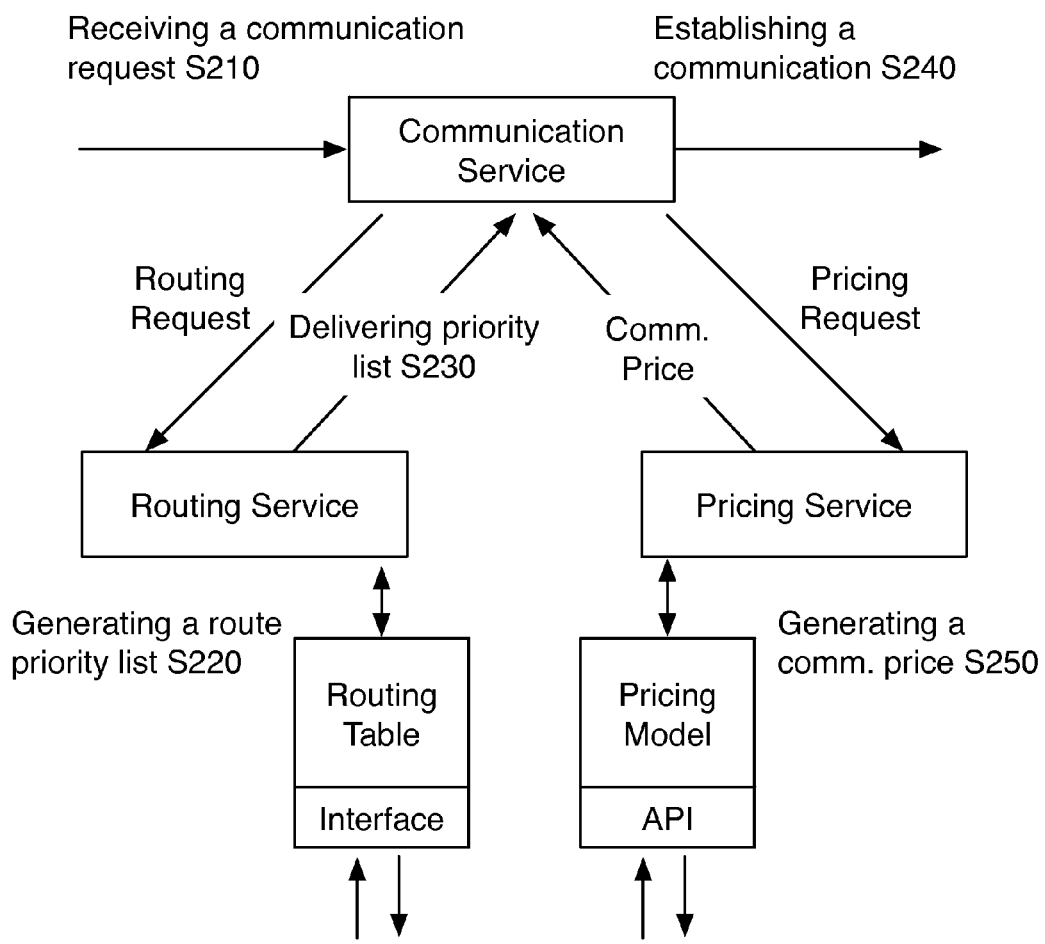
FIG. 2 is a schematic representation of a method of a first preferred embodiment of the invention
Figure 3:
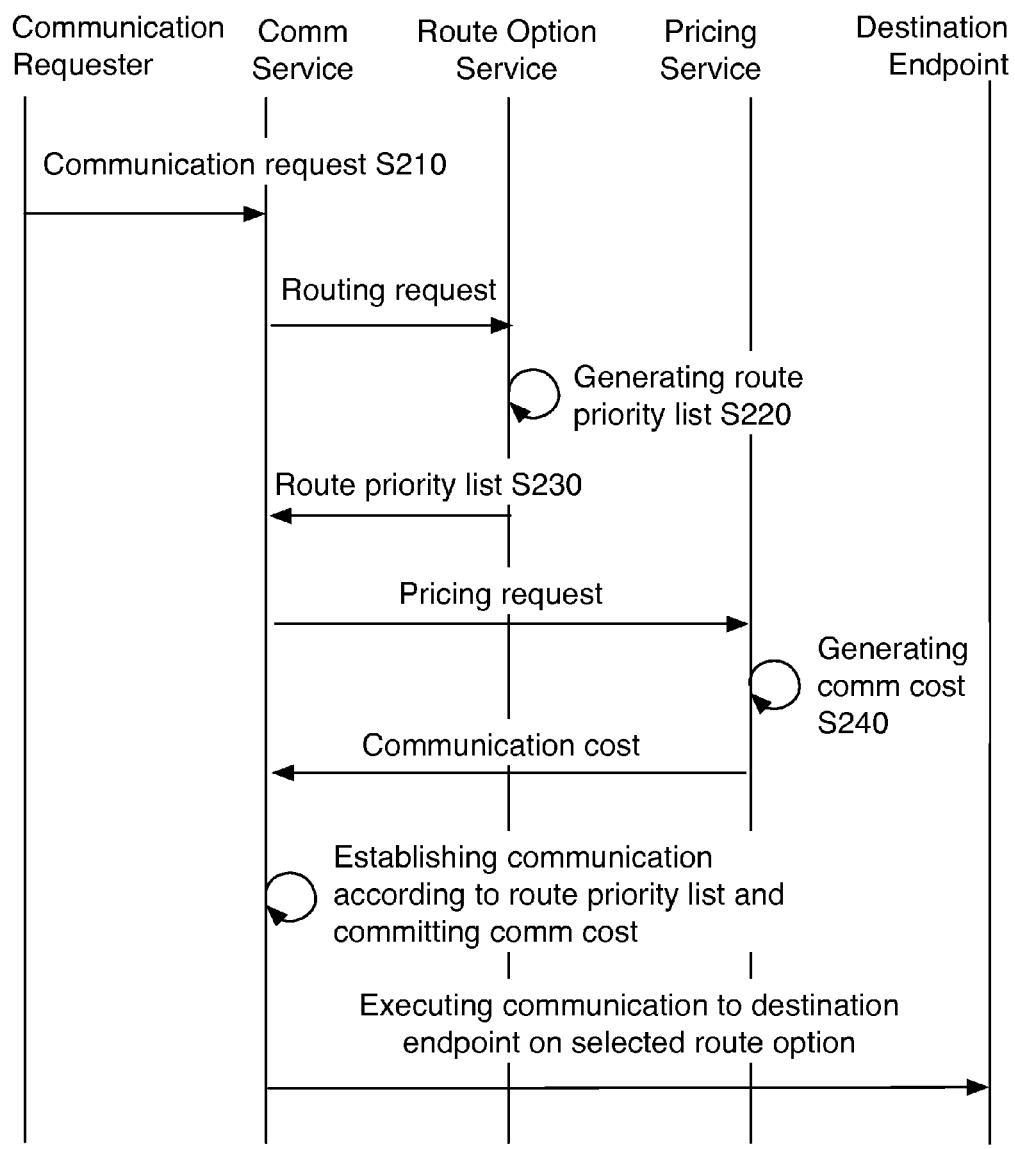
FIG. 3 is a communication flow diagram of a method of a first preferred embodiment.

As shown in FIGS. 2 and 3, a method for routing communications of a preferred embodiment includes receiving a communication request S210, generating a route priority list from the communication request S220, delivering the route priority list to a communication service S230, generating a communication cost S240, and establishing a communication according to the route priority list S250. The method functions to provide reliable and high quality communication while managing a plurality of routing options. The capability to manage and distribute communications effectively across various routing options can be important for the success of a global communication platform. The availability and quality of routing options can be temporally and regionally variable. Communication routes of a particular carrier can suddenly reduce in quality or stop functioning all together. Additionally, to provide numerous routing options in case a carrier does go down, a plurality of carriers must be maintained which typically requires at least some minimum usage requirements. The method for routing communications can preferably account for such scenarios through route option management. Furthermore, by integrating a substantially separate communication cost service, the method can provide consistent cost accounting for users of a communication platform. In a preferred variation, pricing for account usage of the communication platform is dependable and predictable despite possibly highly variable underlying communication execution. The method is preferably implemented by a system substantially similar to the system described above, but the method may alternatively be implemented by any suitable system. The method may be used on a communication platform allowing only a single mode or medium of communication (e.g., just text messages or just voice sessions), but the communication platform can additionally include multimodal communication wherein, the method can accommodate route selection and communication cost.

Block S210, which includes receiving a communication request, functions to obtain an instruction for sending or establishing an outbound communication. The communication request is preferably received at a communication service, which as described can be a server or machine that establish a communication or at least direct a secondary service to establish a communication. The communication service may be specifically configured for a particular medium or mode of communication such as Public Switch Telephone Network (PSTN) calls, Session Initiation Protocol (SIP) voice or video calls, Short Message Service (SMS) messages, Multimedia Messaging Service (MMS) messages, IP based messaging, push notifications, proprietary communication protocols, and/or any suitable communication medium. The communication service may be used for a plurality of communication mediums. A communication request can include communication properties, which can include at least one destination endpoint, one originating endpoint, communication content, and/or other properties of the communication. The communication request can additionally include control properties such as a max price parameter, a quality limit, and/or other properties used to gate or control communication.

In one implementation, the communication request can indicate communication intent. As opposed to specific communication instructions (e.g., send a SMS message to this endpoint originating from this endpoint), the communication request can include intended communication content that indicates generalized objectives of the communication. The intended communication content can specify raw message content or medium of communication. In the case of asynchronous communication, the request of communication intent can include content intended for delivery and the intended destination entity. The final form of the content, whether the transmitted content is text, a graphic, a video, a link to an external resource, an audio message, and/or any suitable medium is not exclusively determined through the request as long as the content is delivered. Similarly, the exact destination endpoint is not strictly defined as long as the message is delivered to the intended entity. In the case of synchronous communication, the mode of communication can similarly be generalized. The communication request can include a specified mode of communication, which can place limits on the suitable routing options. The possible modes can include a voice session mode (where synchronous audio should be transmitted between at least two endpoints), a video session mode (where video and/or audio should be transmitted between at least two endpoints), and synchronous message transmission mode (where text, images, videos, and/or other media can be delivered to a destination). A voice session mode can result in a voice session (e.g., PSTN or SIP based), a video session with only audio, or any synchronous form of communication through which audio can be transmitted. A video session can be a video session or alternatively downgraded to just audio. An asynchronous message transmission mode can result in any executed communication that transmits desired content. Synchronous communication mediums can similarly be used when in an asynchronous message transmission mode.

Upon receiving a communication request, at least a subset of information from the communication request is sent to the routing service. Preferably, the subset of information sent to the routing service is sent in the form of a routing request. The subset of information includes communication properties specified in the communication request of block S110. Additionally, at least a subset of information from the communication request may be sent to a communication cost service. Preferably, the subset of information is sent to the communication cost service in the form of a cost request. The routing request and the cost request preferably include at least the destination of the communication. The routing request and/or cost request may additionally or alternatively include content of the communication, account information for the entity sending the communication request, the originating endpoint, the mode or medium of communication, and/or any suitable information. The routing request and the cost request are preferably sent in parallel but may alternatively be sent sequentially or in any suitable manner. The routing request and the cost request can be independent in that how a communication is routed and the attributed costs of that communication do not directly rely on each other. One expected benefit is that the quality of communication can be increased while simulating a simplified cost model to user accounts. As described below, a maximum cost parameter specified in a communication request can be accommodated after initially fulfilling the requests.

In one variation, the communication properties include a specified transport mode of communication. The specified transport mode can be a set of modes of communication permitted and/or blocked for the communication request. The set of operational transport modes can include a synchronous voice session mode of communication, a synchronous video session mode of communication, an asynchronous message transmission mode of communication and/or specific permitted/prohibited transport protocols (e.g., SMS, MMS, push, etc.).

Block S220, which includes generating a route priority list from the communication request, functions to determine at least one routing option to be used for the communication. The priority list is preferably generated at a routing service upon the routing service receiving the routing request from the communication service. The generated priority list preferably includes a plurality of routing options. The routing options can include a ranking or one or more properties that can be used to rank and select a final routing option. The priority list is preferably dynamically generated for each communication request according to at least one parameter of the routing request. The priority list may alternatively be cached from previous similar communication requests, be a fixed priority list, or otherwise pre-generated at any suitable time. Generating a route priority list may include a number of various processes. Generating a route priority list may include factoring in current routing option status (e.g., carrier connectivity or availability), current routing option quality, minimum communication commitments (i.e., communication quota prioritizations), contractual agreement parameters with a routing option, routing option internal cost (e.g., cost of the routing option to the communication platform), destination presence, cost of a routing option for the communication service, geographical proximity of the destination and/or source, the medium(s) of the communication, and/or any suitable parameter to generate a route priority list.

Generating a route priority list can include identifying at least two routing options capable of completing the communication request and identified according to a priority heuristic. The priority list is preferably generated in part through use of a routing table, and identifying at least two routing options includes querying a routing table of routing options. The routing options in the routing table can be indexed by communication properties. In querying routing options, the intended communication content can be analyzed to identify suitable transport protocols. The routing options of suitable transport protocols can then be filtered according destination endpoint. A destination can be identified as including an associated carrier, a country/regional location property, and/or device capabilities. Routing options having been reduced to routings options capable of communication intended content and capable of delivering to the intended destination can then be further filtered according to availability. Some routing options can be suffering from down time or quality issues at any given time—such routing options are preferably not added to a routing priority list. The routing table is preferably a data resource accessible by the routing service. The priority list preferably includes a list of routing options associated with various primary keys. In one exemplary embodiment, the routing service preferably uses the destination endpoint (e.g., telephony country code prefix) as a primary key. Each routing option and primary key pair preferably includes a priority and weighting parameter, but may alternatively or additionally includes any suitable parameters. The priority and weighting parameters are preferably used in generating a priority list for an individual communication. The priority is preferably used as a rank magnitude factor, and the weighting parameter preferably factors into the probability of using that routing option for a given routing request. The routing table can include each available routing option for all forms of communication. Of the full set of routing options only a subset of routing options may be compatible for serving a communication defined by the communication properties. In the variation of a multimodal communication platform with unified communication intent, the compatible routing options may including routing options for more than one communication protocol or medium. The routing table can be structured a number of ways. As shown in FIG. 4, a routing option can include a singular prioritization parameter or weight. A singular prioritization score can be calculated using several external factors. As shown in FIG. 5, a routing option can include several parameters that are used to select compatible routing options.

Prioritization heuristics can consider many factors. A first factor gives weight to a routing option based on the involved content transformations. For example, sending a text message would give preference a routing option involving an SMS with text over a routing option involving transforming the text to text-to-speech audio and playing over a PSTN phone call.

A second factor gives weight to routing options with better quality scores.

A third factor gives weight to routing options that have not satisfied a communication quota or contractual obligation. A quota can be set for a time frame, and a routing option has the target of satisfying the quota in that time frame. For example, an SMS routing option can have a quota of five thousand messages in a month. Selection of a routing option within a priority list or prioritization within the list can be based on satisfying the quota. For example, a routing option further from a quota can be prioritized above a routing option that has satisfied a quota, surpassed a quota, or does not include a quota as shown in FIG. 6. Additionally, a quota can be weighted to indicate importance of the quota. For example, some routing options may have a more important quota goal (e.g., a routing option will be cancelled by a carrier), and other routing options may have less important quota goal (e.g., special discounting pricing isn't provided if not satisfied). Various rules and properties can be encoded into a routing option to facilitate relative prioritization/selection of routing options. One exemplary use of a quota includes a routing option using a particular network carrier that was negotiated at an internal cost rate that has a minimum number of communications that should be met. Another exemplary use of a quota may include regulating a routing option with a rate limit of SMS messages sent in a minute allowed over a network carrier of a second routing option.

A fourth factor gives weight to routing options with lower internal cost (e.g., payment to outside partners and/or operational cost). A related heuristic can include calculating effective internal cost of a routing option. The effective internal cost is the predicted cost to the communication cost to the platform. In some cases, communicating over a first transport protocol has different communication limits compared to a second transport protocol and as a result a routing option of the first transport protocol may require transmitting the intended content in one form (e.g., in a single message) and the routing option of the second transport protocol may require transmitting the intended content in a second form (e.g., split into two or more messages). The effective internal cost can be the number of messages to transmit the intended content multiplied by the internal cost of an individual message transmitted on the routing option as shown in FIG. 7. The cost can be a financial cost and is frequently dependent on the specific routing option. The difference between the communication cost and the effective internal cost can be the profit of the platform for an individual communication. The priority heuristic is preferably in place to increase profits across a plurality of communications.

A fifth factor gives weight to routing options with particular feature capabilities (e.g., message confirmation, no message size restrictions). These factors and other suitable prioritization factors can be combined in any suitable manner to form a prioritization heuristic used in ranking routing options.

Figure 8:
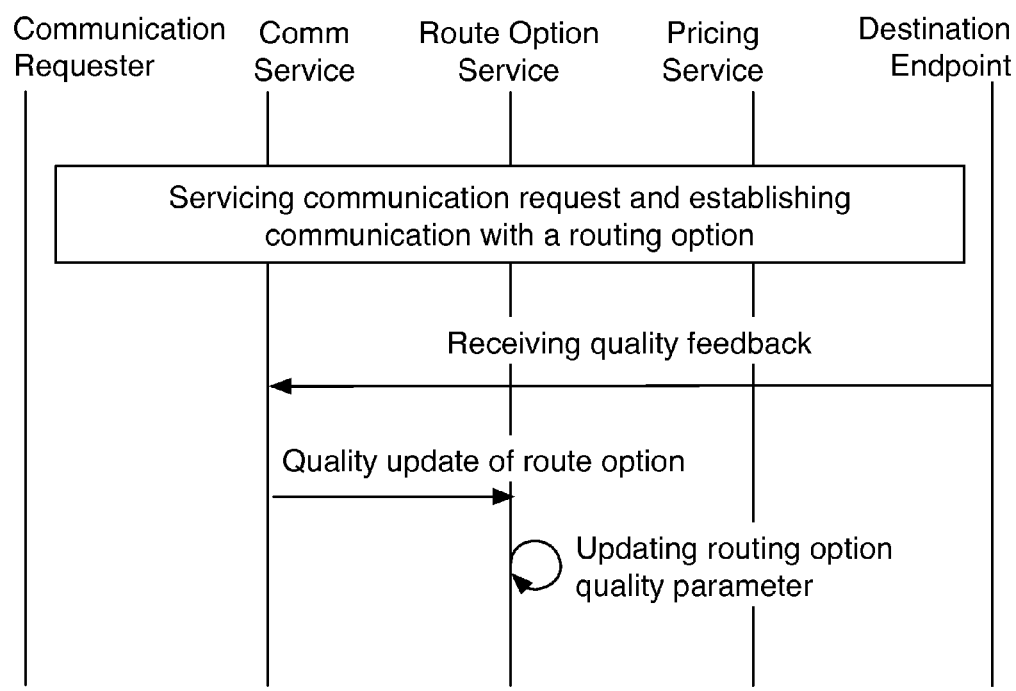
FIG. 8 is a communication flow diagram of updating routing options through an interface.

The method may additionally include updating a routing table through a routing table interface. The routing table may be automatically updated based on system inputs such as carrier quality metrics. The method can include measuring quality of an executed communication over a routing option, and through the routing interface, updating quality parameters of the routing option in the routing table with the measured quality metrics as shown in FIG. 8. The quality can be measured through a quality control service or system operable on the communication platform. Other properties of a routing option can similarly be updated of automatically controlled. Additionally or alternatively, the routing table may be updated by a user through a user interface. The user interface can allow parties responsible for maintaining and managing routing options to easily update and modify routing options through a simple interface. The user interface can be an administrator website, an application, or any suitable tool. As a benefit of the method, a routing option management user interface enables newly added or modified routing options to immediately be usable within a system. Updating the priority, weighting, and/or other parameters of a routing option enables an administrator or application to update the routing table to accommodate various factors. For example, an administrator may learn of service problems with an external routing option and accordingly, temporarily deprioritize that routing option.

Block S230, which includes delivering the route priority list to a communication service, functions to communicate the route priority list from the routing service to the communication service. As mentioned above, the priority list preferably includes a plurality of routing options ranked according to the route service determined preference for using that routing option. The route priority list can include routing options of different quality and preference. Similarly, the route priority list may include routing options of more than one medium or mode of communication. A first routing option can be a routing option of a first communication protocol (e.g., SMS), and a second routing option can be a routing option of a second communication protocol (e.g., MMS). The route priority list is preferably delivered to the communication service prior to establishing a communication.

Block S240, which includes generating a communication cost, functions to calculate a price for a communication. The generated cost is preferably the price charged for the account associated with the communication (e.g., the entity initiating the outgoing communication). The cost can alternatively be resource cost such as processor, storage, data transfer, or other operational cost. The cost is an external cost that is used exposed to the associated account or client. The price of the actual routing option used in the established communication may not correspond to the price generated at the communication cost service. An internal cost will reflect the operational and/or financial cost incurred by the communication platform (e.g., the amount a network charges the platform for a text message). A cost margin is the differences between the external cost and the internal cost and can equate to earned profit of a communication in a simplified model. In execution, the internal costs can be highly complicated due to convoluted contracts, but the external costs are preferably normalized or maintained to hide underlying complexity. As a result, the earned profit is not a fixed amount for each communication and is dependent on the cost model and/or the cost of using a selected route.

The cost is preferably independently generated without direct dependence on the communication route. The cost is preferably generated according to parameters of the communication. Parameters of the communication may include destination endpoint, account information, context of the communication (e.g., if the communication is the $1000^{th}$ communication, if a particular number of communications are made in a given time window, etc.), content of the communication, and/or any suitable parameter. Using such parameters, the communication service can provide powerful pricing functionality that enables features such as offering pricing specials to customers, unique pricing per account or account type, altering pricing for content of a message, and/or any other suitable pricing features. A cost model (e.g., a pricing model) is preferably used in at least part of the generation of the price. A communication cost from the cost model is preferably selected according to a primary key. A primary key may be any suitable communication parameter as described above or any suitable key. A cost model can additionally determine cost based on multiple communication properties. The cost model can characterize the set of individual billable items that collectively define cost for any communication on the communication platform. The generation of a communication cost is preferably performed in parallel to generating a route priority list, but may alternatively be performed at any suitable time. Generating a communication cost is preferably performed in response to a cost request.

The cost request is preferably sent from the communication service, but the cost request may alternatively be made through a communication cost service API by any suitable party. The communication cost service API preferably enables outside entities to include communication pricing in any application logic without making communication request. A communication cost is transmitted to a communication service in response to the cost request. If the cost request is made by the communication service, the communication cost is preferably charged to an account in response to establishing the communication. If no communication is established the price may not be charged to the account.

Figure 9:
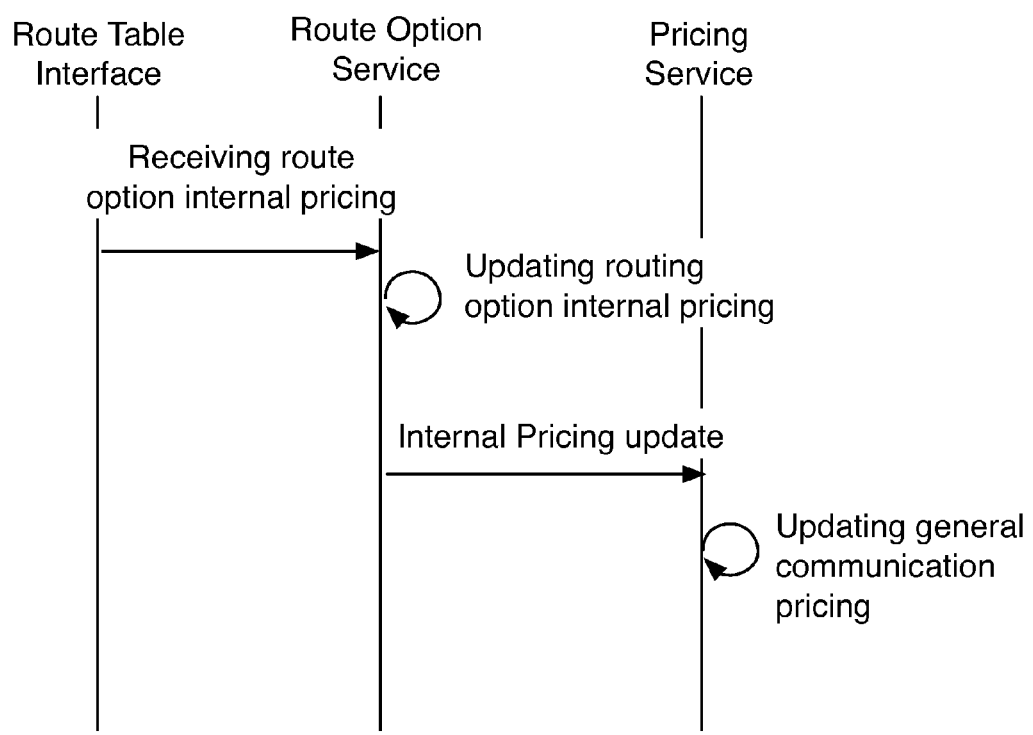
FIG. 9 is a communication flow diagram of updating communication pricing through an interface.

In another alternative embodiment, the method may additionally include periodically updating the cost model and/or automatically updating the cost model. The cost model may include input from the routing service and/or routing table. Preferably, the cost model is updated periodically such that prices are consistent during a particular time window (e.g., a month or a week). The cost, priority, weighting, history, and/or any suitable parameters of the routing options may be used to generate the cost model. The routing options of the routing table in the routing service can include a parameter of internal cost. Alternatively or additionally, the cost model may be dynamically updated in response to real-time changes in the communication service as shown in FIG. 9. A cost API or other suitable interface can be used to access and modify a cost model of the cost service.

Figure 10:
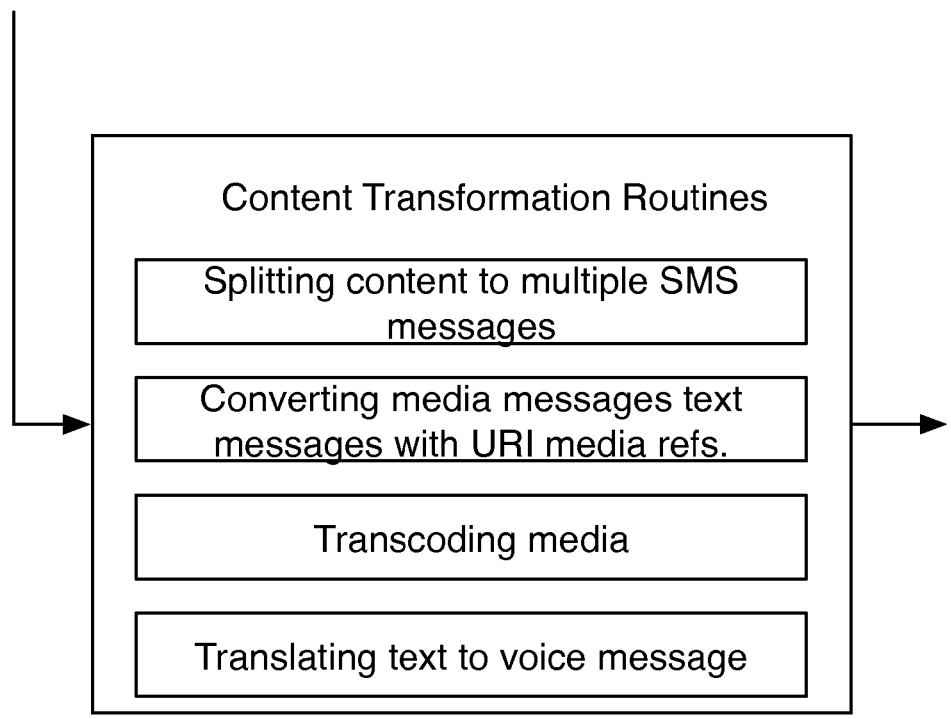
FIG. 10 is a schematic representation of exemplary transformations applied to intended content of a communication to a format suitable for a transport protocol of a selected routing option.

Block S250, which includes establishing a communication according to the route priority list, functions to use the route priority list to determine how a communication should be made. Establishing a communication preferably includes sending an outgoing message, establishing a communication link between the source and destination, or completing any suitable operation to successfully fulfill the communication request. In some variations, a response may be sent to the source of the communication request indicating a failure to establish a communication. Preferably, the routing option with the highest priority in the route priority list is selected. The communication service may alternatively use any suitable logic to select a routing option from the priority list. Additionally, establishing a communication may include determining that the routing options of the route priority list are not suitable for communication and selecting a default routing option for establishing communication. In a variation where the medium(s) of communication can verify that communication is established (e.g., SIP voice or video calls), the communication service will preferably initially attempt to establish communication with a first routing option from the route priority list. If communication is unsuccessfully established, the communication service will preferably attempt communication with a second routing option from the route priority list. In an alternative embodiment where the medium of the communication may be selected from a plurality of mediums, establishing a communication may include converting content of a communication request to a second medium as shown in FIG. 10. For example, if a communication request is for sending a text message, but the routing option is a voice routing option, a text to speech (TTS) component can convert the text to a speech recording. In a first variation, a text message can be converted into a text body of MMS message, a text-to-speech audio file played over a voice connection, and/or a text graphic displayed in a video chat session. In a variation, where the original mode of communication is a voice session, the used route can be an audio or video synchronous session. Similarly, if the original mode of communication is a video session, the used route can be a video or an audio only version in a synchronous audio session. In some variations, the selected routing option can include identifying a communication endpoint associated with the destination endpoint provided in the communication request. For example, the destination endpoint may be a phone number, but the selected routing option is for establishing a SIP voice session. A SIP address associated with the phone number if stored can be accessed and if found can be used for the SIP communication. If a required communication endpoint of a routing option is not available, that routing option can be foregone for another routing option of the routing priority list. Additionally, during multimodal communication, the communication service or some additional service can translate/convert between communication protocols and mediums used by the originating endpoint and the destination endpoint. Additionally, Block S250 can include committing a cost of the communication cost response, which functions to credit the cost to the account associated with the communication. The cost is preferably committed to a cost or billing log of an account. The account can be associated with the originating endpoint, the destination endpoint, the source of the request, and/or an account identified by the requesting entity.

Figure 11:
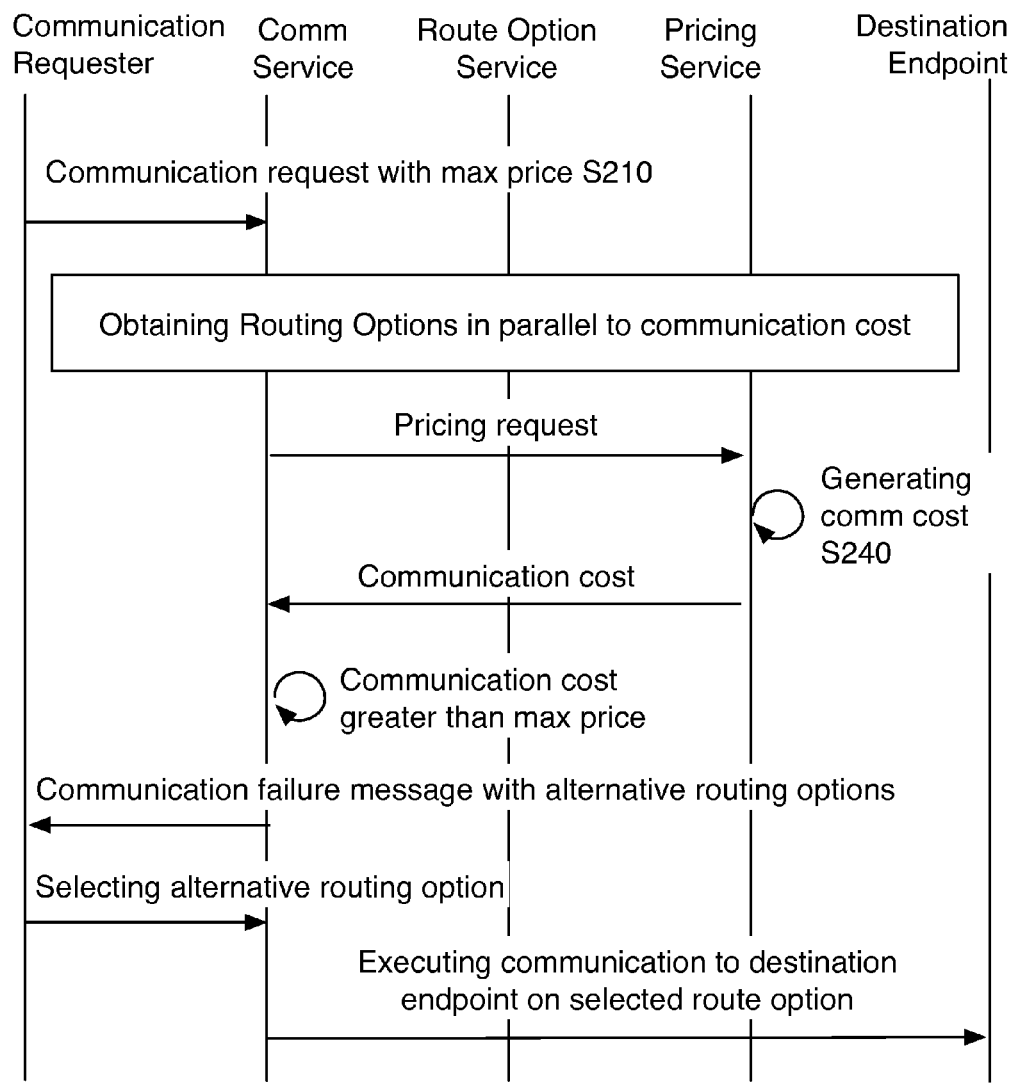
FIGS. 11 and 12 are communication flow diagrams of alerting an account resource of communication failure.
Figure 12:
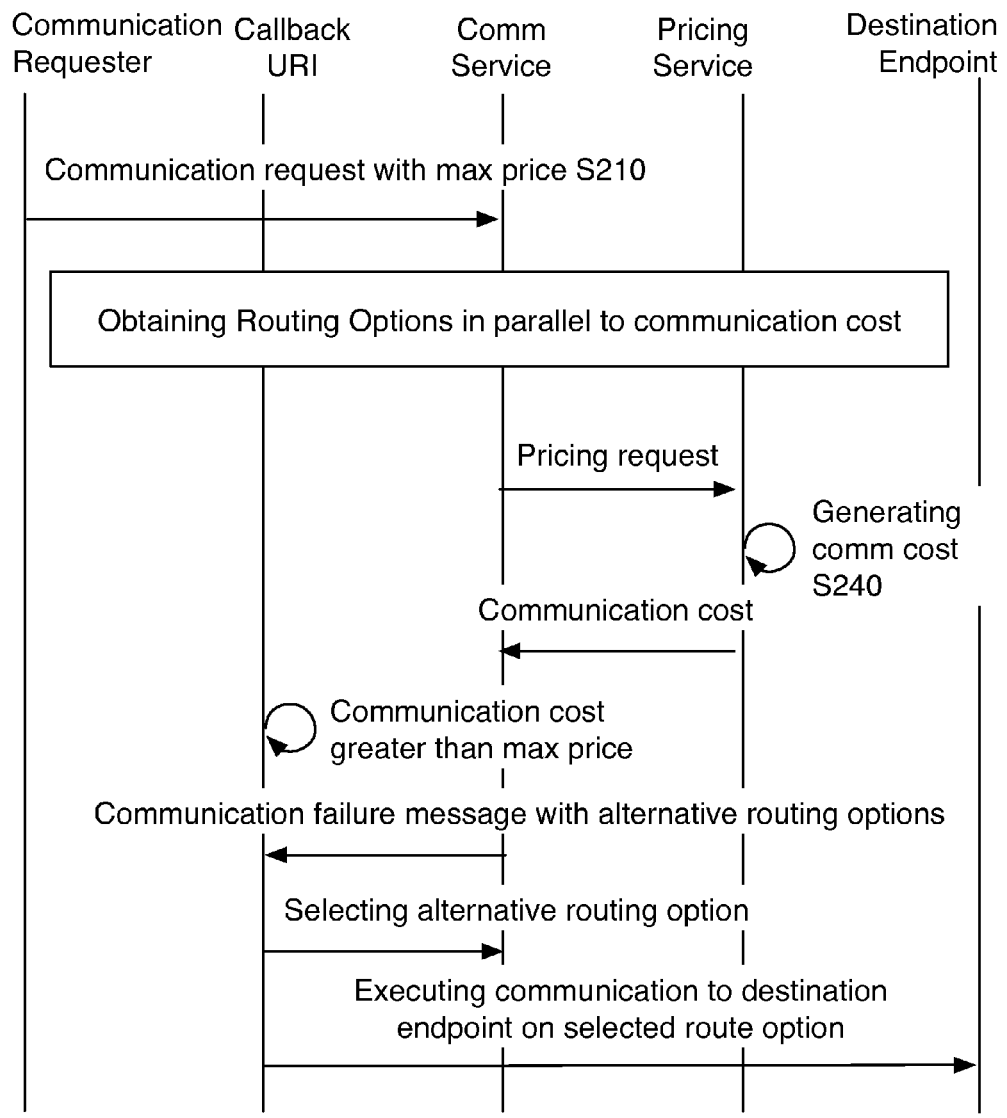

In one alternative embodiment, a communication request may include a maximum cost parameter. The max cost will preferably restrict the communication according to the generated communication cost. The maximum cost is preferably the most that an account or entity is willing to incur due to the communication. The max price can be used as a control mechanism to indicate that quality, urgency, and/or deliverability can be compromised to match a price. Communications can be canceled, delayed, sent over lower quality routing options, or transformed into alternate mediums in response to a maximum cost parameter. If the generated communication cost is less than the max cost parameter, then the communication can be completed at the generated communication cost. If the generated communication cost is greater than the generated price, then the communication is preferably completed at the max cost rate, augmented into a compromised form of communication, or alternatively not completed. Additionally or alternatively, if the communication price does not comply with the maximum cost parameter, the method can include alerting an account resource of the communication failure. Alerting an account can include responding to the communication request with a communication failure message as shown in FIG. 11 or transmitting a message to a callback URI as shown in FIG. 12. A communication failure message can include information about the routing options such as routing option prices, transport modes, and other options. In one variation, an account can respond and select one of the alternative routing options, that alternative routing option is executed. Augmenting the communication can include using a routing option from the routing priority list that is selected with a modified heuristic. For example, a routing option can be selected with the lowest internal cost. Any suitable action may alternatively or additionally be performed when the max rate is exceeded. For example, an application may be messaged when the price exceeds a max cost, and the application can respond in a callback to provide subsequent actions. In another example, communication may be allowed for a particular time period while only charging the max cost for each communication. After a set amount of time or after a certain number of communications, the communication cost can be enforced. In another alternative variation, max cost of the request may be used to schedule communication. When the communication exceeds a max cost, the communication service and the communication cost service preferably cooperate to delay sending the communication until the communication cost satisfies the max cost restriction. This would be particularly useful for communications that are not time sensitive. Similar to the max cost parameter, a received communication request may include other communication restrictions. Such restrictions may behave similarly to the max cost parameter to impact routing decisions, medium decisions, communication scheduling, application callbacks, or any suitable variable aspect of the communication.

In one exemplary application, a method of a preferred embodiment may be used to manage multiple carriers for voice and video calls and/or SMS messaging. In such an example, each carrier may have minimum commitments for the communication service as agreed upon in a contract with the communication platform (e.g., the operator of the communication service will be charged for at least x number of messages during a month). Logic for generating the route priority list preferably incorporates such minimum requirements and any other suitable aspects of the contract. The generated priority list will typically provide prioritized routing options for the best communication performance, but for a sub-set of the communication requests a communication may use a routing option that contributes to satisfying a carrier agreement. In performing the method, the communication platform can preferably offer a high quality of service while simultaneously maintaining a diverse set of routing options. The method may incorporate the minimum commitments into the step of generating a route priority list. Such a use case is valuable to a communication platform as it allows the communication platform to feasibly and economically maintaining numerous carrier agreements. Maintaining numerous carrier agreements can be important for scaling communication platforms globally.

In a second additional or alternative application, a method of a preferred embodiment may be used to provide dynamic communication mediums for communication directed to an individual. Communications are preferably routed based on the optimal medium for accessing an individual for whom a plurality of endpoints is known. This application preferably relies on a presence service to provide presence information of an individual. Alternatively, the various medium endpoints of an individual may be stored and prioritized such that the medium preferences for each individual may be customized. Communications can preferably be converted to a plurality of other mediums. For example, a communication request including text and a destination may be sent as text in an SMS, text attachment in an MMS, a TTS audio recording, or any suitable media that communicates the desired content of the communication. Additionally, a communication request may specify medium preferences, instructions, or any suitable medium-associated parameters.

An alternative embodiment preferably implements the above methods in a computer-readable medium storing computer-readable instructions. The instructions are preferably executed by computer-executable components preferably integrated with a communication routing system. The communication routing system may include a communication system, routing system and a pricing system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
at a communication service, receiving a communication request of an account, the communication request including communication properties that include at least one destination endpoint;
transmitting a routing request to a route option service, the routing request including the communication properties;
at the route option service, identifying at least two routing options capable of completing the communication request and identified according to a priority heuristic, and transmitting a routing response to the communication service, the routing response including a route priority list of identified routing options, wherein each of the routing options includes an associated internal cost to the communication service;
transmitting a communication cost request to a cost service, the communication cost request including the communication properties;
at the cost service, generating an external communication cost from the communication properties, wherein the communication cost is generated independently from identifying the at least two routing options, and returning a communication cost response to the communication service; and
at the communication service, upon receipt of the routing response and the communication cost response, executing a communication with a routing option of the routing priority list and committing the external communication cost to the account.

2. The method of claim 1, wherein identifying at least two routing options comprises querying a route table of routing options indexed by communication properties; and wherein generating the external communication cost comprises querying a cost model with the communication properties.

3. The method of claim 2, further comprising providing a cost interface to the communication cost service; updating the cost model according to requests received through the cost interface; and providing a routing interface and updating the route table according to requests received through the routing interface.

4. The method of claim 3, further comprising measuring quality of executed communication of a routing option of an executed communication; and through the routing interface, updating a quality parameter of the used routing option of the route table according to the measured quality.

5. The method of claim 3, wherein routing options of the route table include an internal cost parameter; and at the route option service, transmitting an internal cost parameter update to the cost service through the cost interface when a new internal cost parameter of a routing option is set; at the cost service, updating a communication cost within the cost model when an internal cost parameter update is received.

6. The method of claim 2, wherein transmitting the routing request to the route option service and transmitting the communication cost request to the cost service are initiated in parallel.

7. The method of claim 1, wherein identifying at least two routing options according to a priority heuristic comprises analyzing intended communication content and identifying routing options with transport capabilities of delivering intended communication content to the destination endpoint.

8. The method of claim 7, further comprising calculating an effective internal cost of communicating intended communication content; and prioritizing routing options of the route priority list in part according to the effective internal cost of the routing options.

9. The method of claim 8, wherein calculating an effective internal cost comprises calculating a number of message communications executed to communicate the intended communication content multiplied by the internal cost of an executed communication of the routing option.

10. The method of claim 1, wherein identifying at least two routing options according to a priority heuristic comprises prioritizing a routing option that has not fulfilled a usage quota over a routing option that has fulfilled a usage quota.

11. The method of claim 1, wherein executing a communication with a routing option of the routing priority list comprises transforming content of the communication properties to a format compatible with a transport protocol of the selected routing option.

12. The method of claim 1, wherein the cost is price of a communication is a monetary price, and committing a cost of the communication includes charging an account the monetary price.

13. The method of claim 1, wherein selection of communication cost is selected independent of route priority list.

* * * * *